(12) United States Patent
Fredriksson (10) Patent No.: US 8,737,426 B1
(45) Date of Patent: May 27, 2014

(54) HIGH SPEED EMBEDDED PROTOCOL FOR DISTRIBUTED CONTROL SYSTEM

(71) Applicant: Lars-Berno Fredriksson, Kinna (SE)

(72) Inventor: Lars-Berno Fredriksson, Kinna (SE)

(73) Assignee: Concio Holdings LLC, Winnetka, IL (US)

( * ) Notice: Subject to any disclaimer, the term of this patent is extended or adjusted under 35 U.S.C. 154(b) by 0 days.

(21) Appl. No.: 13/833,238

(22) Filed: Mar. 15, 2013

(51) Int. Cl.
*H04J 3/16* (2006.01)

(52) U.S. Cl.
USPC .......................................... 370/464; 370/466

(58) Field of Classification Search
CPC ......... H04L 29/06; H04L 69/18; H04L 69/22; H04L 12/2602; H04L 43/00; H04L 43/0805; G05B 2219/25032
USPC .......................................... 370/389, 464, 466
See application file for complete search history.

(56) References Cited

U.S. PATENT DOCUMENTS

| | | | |
|---|---|---|---|
| 5,696,911 | A | 12/1997 | Fredriksson |
| 6,430,164 | B1 * | 8/2002 | Jones et al. .................... 370/313 |
| 6,636,100 | B1 * | 10/2003 | Shingaki ........................ 327/388 |
| 7,103,688 | B2 | 9/2006 | Strong |
| 7,472,216 | B2 | 12/2008 | Fredriksson et al. |
| 7,478,234 | B2 | 1/2009 | Fredriksson |
| 7,711,880 | B2 | 5/2010 | Fredriksson |
| 7,899,936 | B2 | 3/2011 | Fredriksson et al. |
| 7,934,039 | B2 | 4/2011 | Fredriksson et al. |
| 8,065,052 | B2 | 11/2011 | Fredriksson et al. |
| 8,321,612 | B2 | 11/2012 | Hartwich et al. |
| 2005/0251701 | A1 * | 11/2005 | Fredriksson .................. 713/500 |
| 2010/0272102 | A1 * | 10/2010 | Kobayashi .................... 370/389 |
| 2011/0013564 | A1 * | 1/2011 | Zou et al. ..................... 370/328 |
| 2013/0080585 | A1 * | 3/2013 | Schaffner et al. ............. 709/217 |
| 2013/0172046 | A1 * | 7/2013 | Rofougaran ................. 455/553.1 |

FOREIGN PATENT DOCUMENTS

| | | |
|---|---|---|
| WO | 2012150248 | 11/2012 |
| WO | 2013000911 | 1/2013 |
| WO | 2013000916 | 1/2013 |

(Continued)

OTHER PUBLICATIONS

Hartwich, F., et al.; "The Configuration of the CAN Bit Timing", presented at 6th International CAN Conference; Nov. 2-4, 1999; Turin, Italy; published by CAN in Automation (CiA); Nuernberg, Germany; 10 pages.

(Continued)

*Primary Examiner* — Hassan Kizou
*Assistant Examiner* — Deepa Belur
(74) *Attorney, Agent, or Firm* — Fitch, Even, Tabin & Flannery LLP (57) ABSTRACT

A control network communication arrangement includes a second protocol embedded into a first protocol in a way that modules supporting the second protocol may be aware of and utilize the first protocol whereas modules supporting only the first protocol may not be aware of the second protocol. Operation of modules using the second protocol does not disturb operation of the modules not configured to use or understand the second protocol. By one approach, the messages sent using the second protocol will be seen as messages sent using the first protocol but not having a message necessary to understand or as needing a particular response. In another approach, modules using the second protocol can be configured to send message during transmission of first protocol messages by other modules, the second protocol messages being trigger off of expected aspects of the message sent under the first protocol.

29 Claims, 5 Drawing Sheets

(56) References Cited

FOREIGN PATENT DOCUMENTS

| WO | 2013020781 | 2/2013 |
|----|------------|--------|
| WO | 2013030095 | 3/2013 |
| WO | WO2013164390 A1 * | 11/2013 |

OTHER PUBLICATIONS

Robert Bosch GmbH; Web Pages "CAN With Flexible Data-Rate"; Aug. 2011; http://www.bosch-semiconductors.de/media/pdf_1canliteratur/can_fd.pdf; 14 pages.

Swedish Standards Institute; SS-ISO 11898-1; "Road Vehicles-Controller Area Network (CAN), Part 1: Data Link Layer and Physical Signalling"; Dated Dec. 5, 2003; Published Jan. 2004; 51 pages.

Swedish Standards Institute; SS-ISO 11898-1; "Road Vehicles-Controller Area Network (CAN), Part 1: Data Link Layer and Physical Signalling"; Dated Dec. 5, 2003; Published Jan., 2004; Updated 2006; 51 pages.

Robert Bosch GmbH; "CAN With Flexible Data-Rate"; Apr. 17, 2012; www.bosch-semiconductors.de/media/pdf_1/canliteratur/can_fd.pdf; 34 pages.

Imran, S., et al.; "Improving information throughput in Can networks: Implementing the dual-speed approach"; Embedded Systems Laboratory, University of Leicester, University Road, Leicester, LE1 7RH; published 2009; 6 pages.

Ziermann, T., et al.; "CAN+: A new backward-compatible Controller Area Network (CAN) protocol with up to 16× higher data rates"; Hardware/Software, Co-Design, Department of Computer Science, University of Erlangen-Nuremberg; published 2009; 6 pages.

Herrewege, V. A., et al.; "CANAuth—A Simple, Backward Compatible Broadcast Authentication Protocol for CAN Bus"; Ku Leuven Research & Development (University), Belgium; published 2011; 7 pages.

* cited by examiner

PRIOR ART

FIG. 3

PRIOR ART

FIG. 4

PRIOR ART

HIGH SPEED EMBEDDED PROTOCOL FOR DISTRIBUTED CONTROL SYSTEM

TECHNICAL FIELD

This invention relates generally to electronic communications and more specifically to a high speed protocol for control networks.

BACKGROUND

Electronic devices communicate with each other is a variety of ways, often based upon the requirements of a given context. One such context is that of control systems. Unlike simple communication systems where the system merely allows for communication among the devices communicating on the system, control systems communicate for the purpose of explicit control over the modules connected to communicate over the control system. Such systems then allow other applications to run on the various modules. Those applications in a distributed embedded control systems, however, should work in concert.

To provide that group control, most distributed embedded control systems are built around a communication protocol standard, examples of which include CAN (ISO 11898), SERCOS, FlexRay, EtherCAT, and sometimes even Ethernet among others. Higher layer protocols are embedded on top of the communication standard to provide rules for data exchange among participating applications at Electronic Control Units participating in the control network, timing rules, sequence rules, and the like to facilitate communications between the distributed applications that are exchanging information. CANopen, DeviceNet, SDS, J1939, and NMEA 2000 are just a few examples of protocols that are layered on top of the CAN standard. Even meta protocols like CanKingdom are used, by which higher layer protocols can be constructed and optimized for specific distributed embedded control systems.

Each protocol standard has its own strengths and weaknesses. The ideal communication would have an infinite bandwidth, no latency, and full data integrity. Available communication alternatives are far from the ideal one and compromises have to be found. For instance, Ethernet has a big bandwidth but poor timeliness due to its handling of message collisions. CAN has an efficient collision resolution but low bandwidth and no synchronization support. SERCOS is fast but all nodes have to support the communication requirement of the most demanding node in the system. Accordingly, one big difficulty when designing a distributed embedded control system is to choose the basic communication system to fit the given system's needs. Another complication is that different parts of a system often have different needs. Some parts may involve advanced feedback loops requiring accurate time synchronization and short latencies while other parts may not be time critical at all but instead depend on a correct sequence of events. In another example, a system may during runtime conditions work well with a communication protocol with low bandwidth but would need a high bandwidth for re-flashing modules in a maintenance mode. Moreover, industry requires a number of development and analyzing tools and pool of engineers with an in depth familiarity with the chosen communication protocol to find the correct compromises. To apply the given technologies in a way take advantage of the good properties of a protocol and to minimize its shortcomings typically requires a long time of practical experience in design and maintenance of distributed embedded control systems based on the chosen protocol and its associated tools.

In the example of CAN systems, the CANFD protocol has been developed in an attempt to address the CAN protocol's data bandwidth limitations. This system, however, is not backward compatible with previous CAN-based modules. Accordingly, modules using the CANFD protocol cannot be installed into a control network having CAN-based modules and effect communication with those modules. Another shortcoming is that the CANFD protocol is based on the modules looking for a given set point in time, which requires the modules to have highly accurate clocks and processors. Moreover, although speed is improved over previous CAN-based systems, the maximum message length is still limited to 64 bytes. Such a system lacks in flexibility for system designers.

SUMMARY

Generally speaking, pursuant to these various embodiments, a second protocol is embedded into a first protocol in a way that modules supporting the second protocol may be aware of and utilize the first protocol whereas modules supporting only the first protocol may not be aware of the second protocol. Operation of modules using the second protocol does not disturb operation of the modules not configured to use or understand the second protocol. By one approach, the messages sent using the second protocol will be seen as messages sent using the first protocol but not having a message necessary to understand or as needing a particular response. In another approach, modules using the second protocol can be configured to send message during transmission of first protocol messages by other modules, the second protocol messages being trigger off of expected aspects of the message sent under the first protocol.

In one particular example, the first protocol may be CAN protocol, and the second protocol is a protocol that embeds bits into portions of the CAN protocol such that falling edges of bits in the second protocol will not interfere with normal operation of modules only understanding the CAN protocol. This can be done, for example, by effecting synchronization of modules using both the first and second protocols with a portion of the message packet. Using this approach can allow modules using the second protocol to use messaging controls of the first protocol message that is carrying the second protocol message to control the second protocol message thereby increasing the amount of data that can transmitted with a single second protocol message.

These teachings are scalable such that multiple modules on a single common control network can be using multiple different kinds of embedded protocols within the first protocol. Moreover, modules using the second protocol can be installed into a control network using older modules configured to only use the first protocol, thereby allowing significant flexibility in upgrading portions of an existing control network. These and other benefits may become clearer upon making a thorough review and study of the following detailed description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
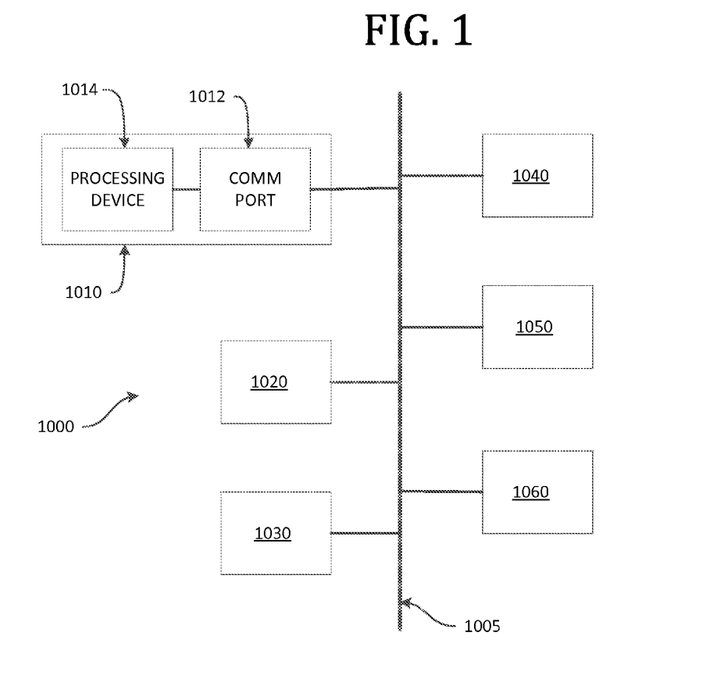
FIG. 1 comprises a block diagram of an example control network as configured in accordance with various embodiments of the invention.

Referring now to the drawings, and in particular to FIG. 1, an illustrative system that is compatible with many of these teachings will now be presented. In FIG. 1, a control network 1000 is illustrated having various devices communicating over a bus 1005, but these teachings can apply to control networks having any of a variety of topologies. The communication device apparatus 1010 can be considered a module or node on the control network 1000 and include a communication port 1012 configured to connect to a control network 1000 according to the control network's topology. The communication device apparatus 1010 also includes a processing device 1014 operatively connected to the control network 1000 to control receiving and sending communications over the control network 1000 via the communication port 1012. Those skilled in the art will recognize and appreciate that such a processor can comprise a fixed-purpose hard-wired platform or can comprise a partially or wholly programmable platform. All of these architectural options are well known and understood in the art and require no further description here.

By one approach, the processing device 1014 is configured to communicate, during transmission of a message packet over the control network 1000 according to a first protocol, a second message embedded within the message packet using a second protocol. The processing device 1014 is further configured to effect synchronization with a second communication device 1020, 1030, 1040, 1050, 1050, and/or 1060 over the control network 1000 for the first protocol and the second protocol based on at least a portion of the message packet.

An example implementation of embedding the second protocol message in the first protocol message will be described with reference to FIGS. 2-10 in the context of a CAN based system. The Controller Area Network (CAN) standard (International Standards Organization (ISO) 11898) is a commonly used protocol for distributed embedded control system although these general teachings can be applied on other protocols as well.

Figure 2:
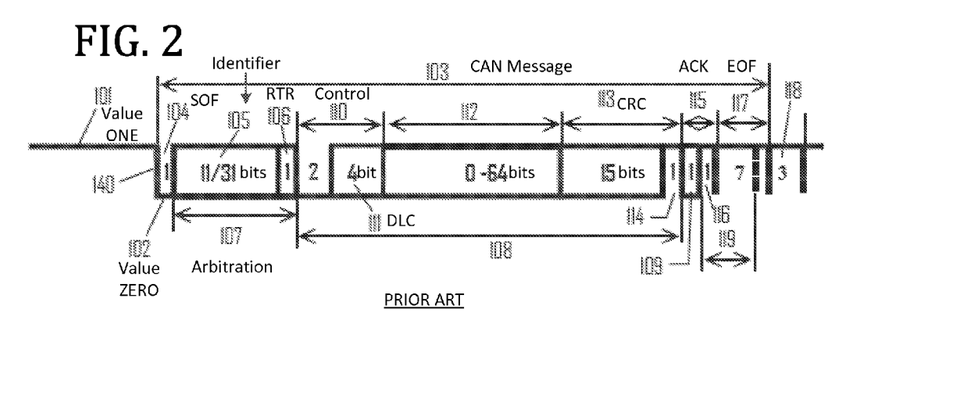
FIG. 2 comprises a schematic of a CAN message.

In this implementation, modules supporting the CAN protocol ISO 11898 can coexist with modules supporting a second protocol on the same bus by abstaining from taking advantage of one or more features of CAN. FIG. 2 shows some main characteristics of CAN. CAN is designed for a bus topology and works with two voltage levels, no voltage 101, representing the value "one," and voltage 102 representing the value "zero." This arrangement implies that a zero is dominant over a one; in other words, if a first transmitter transmits a one and a second transmitter a zero at the same time, then only the zero can be detected. An idle bus can be seen as a continuous stream of ones. A message 103 starts with a zero bit, the Start Of Frame (SOF) 104 followed by an Identifier 105 of eleven (Standard) or 29 (Extended) bits and a Remote Transmit Request (RTR) bit 106. The SOF and Identifier message portions constitute the Arbitration field 107 where bus collisions are resolved by bitwise arbitration. During the remaining part of the message 108 until the Acknowledgment bit (ACK) 109, there is only one transmitter on the bus because the other transmitters are controlled to not be active in response to these initial message portions. This remaining part of the message 108 starts with a Control Field 110 with two dominant bits and a four bit Data Length Code (DLC) 111 indicating the length of the following Data Field 112, which can contain no data (DLC=0) or up to eight bytes (DLC=8). In other words, the Data Field 112 of the standard CAN message can be from 0 to 64 bits long. The message so far is checked by a 15 bit CRC code placed in the sixteen bit CRC field 113, where the last bit is the CRC delimiter 114. The ACK field 115 contains the ACK bit 109 followed by a recessive bit, the ACK delimiter 116. The remaining part of the message 103 is the End Of Frame (EOF)

field 117 containing seven consecutive recessive bits. Three recessive bits, the Intermission 118, have to pass before the bus is free for new messages.

Figure 3:
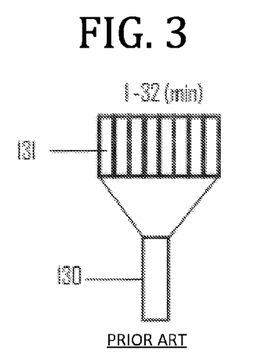
FIG. 3 comprises a schematic of an example CAN bit.

According to the CAN specification (ISO 11898-1), a bit is constructed of time quanta. With reference to FIG. 3, a single bit quantum for the standard CAN message is depicted as time quantum 130, which is a fixed unit of time derived from the oscillator period 131 of the transmitter/receiver's clock. A programmable prescaler with integral values ranges from at least one to thirty-two to define the time quantum as a given number of a minimum time quantum. Accordingly, starting with the minimum time quantum, the time quantum shall have the length of Time quantum=$m$·minimum time quantum where m is the value of the prescaler.

Figure 4:
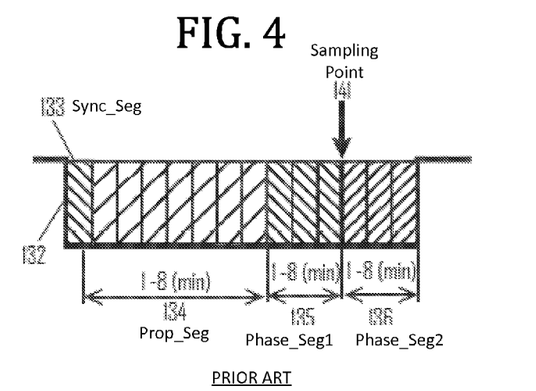
FIG. 4 comprises a schematic of another example CAN bit.

In operation, therefore, another example CAN bit 132 as illustrated in FIG. 4 is constructed of individual time quanta. The first time quantum is the Sync_Seg 133 followed by the Prop_Seg (Propagation Segment) 134 consisting of one up to at least eight time quanta. The propagation segment is defined according to a period of time to make sure a signal wave can propagate from the transmitter to the far end of the bus and back, which would also correspond to the amount of time needed for the furthest module on the control network to receive the message and respond. Accordingly, the Prop_Seg length is set to allow for the bit arbitration aspect of the CAN protocol to work. The final part of the CAN bit 132 includes the Phase Segments, Phase_Seg1 135 and Phase_Seg2 136. The phase segments are symmetrical, each having one or up to at least eight time quanta long. The phase segments take up the time skew between the different nodes in the system. A CAN bit should then be programmable from 4 to at least 25 time quanta.

All clocks in a CAN system are assumed to be unsynchronized. When a SOF 104 is transmitted, each module's clock is synchronized to the falling edge 140, and each module counts the number of time quanta specified for Prop_Seg and Phase_Seg1. The voltage of the signal is measured at the Sampling Point 141. If the voltage is still present, the module decides that a SOF is detected and the following voltage shifts are decoded according to the CAN specification. If there is no voltage at the Sampling Point 141, the falling edge is regarded as a glitch and ignored. This feature can be seen as a low pass filter, filtering out disturbances on the bus, for example, due to wave reflections. Such features make CAN dependable and forgiving in bad wiring installations.

Voltage edges can radiate high frequencies in certain communication systems, thereby causing electromagnetic compatibility (EMC) problems. To reduce such problems, CAN specifies a Non Return to Zero (NRZ) decoding of bits, in other words, consecutive bits of the same value do not generate any edges; instead, the bits are decoded by dead reckoning. The individual modules' clocks are resynchronized on falling edges only, defined as transitions from recessive (1) bits to dominant (0) bits. CAN has a bit stuffing rule that after a sequence of five consecutive bits of the same value, a stuff bit of opposite value shall be inserted to make sure that resynchronizations will take place. Thus a resynchronization will take place at least after ten bits during normal conditions. The CAN specification demands the Sampling Point to stay within the phase segments for at least 13 bits.

More elaborate information about CAN can be found in the ISO standard 1898 and the article "The Configuration of the CAN Bit Timing" by Florian Hartwig and Armin Bassemir (Robert Bosch GmbH, Abt. K8/EIS), presented at 6th International CAN Conference 2nd to 4th November, Turin (Italy), published by CAN in Automation (CiA), Nurnberg Germany, which materials are incorporated by reference in their entireties herein.

Figure 5:
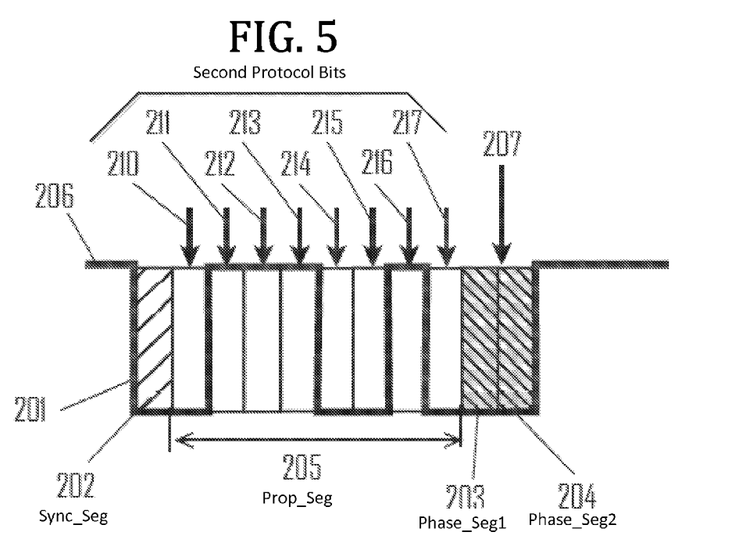
FIG. 5 comprises a schematic of an example of embedding a second protocol message in a portion of a first protocol message, here a Prop_Seg portion of a CAN message, as configured in accordance with various embodiments of the invention.

Turning to FIG. 5, one example solution to the bandwidth problem is to modify a first protocol, here the CAN protocol, to embed a second high speed protocol in portions of a standard CAN message. In such an approach, a processing device of a control network module can be configured to control the second protocol to use a bit rate higher than the first protocol's bit rate, for example, to control the second protocol to use a bit rate having an integer multiple higher than the first protocol's bit rate. The effect is that the processing device is configured to implement the second protocol by adding bits inside of individual bit quanta of the first protocol. In the FIG. 5 example, the second protocol message is embedded in the Prop_Seg of CAN bits transmitted in a CAN message after the Arbitration field of the CAN message. The Propagation Segment is only of use during the arbitration part of a CAN message exchange between nodes. More than one module can be transmitting simultaneously during the arbitration period that may result in fluctuating bit timing. After the arbitration period only one module is transmitting and the bit timing on the bus reflects the oscillator of the transmitter. So configured, the second message may be embedded in the time quanta of Prop_Seg of such CAN bits without concern of being lost to collision noise on the control network. Moreover, a module that is not configured to receive messages in the second protocol will not be looking for signal changes during the Prop_Seg of such bits such that signal variations in this portion of the message will not adversely affect such modules. Accordingly, the processing device is configured to implement the second protocol by adding bits inside of individual bit quanta of the first protocol not measured to be a particular level according to the first protocol.

Figure 6:
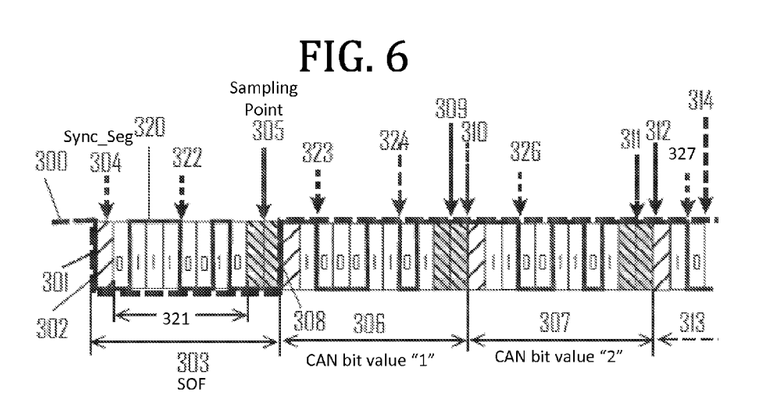
FIG. 6 comprises a schematic of another example of embedding a second protocol message in a portion of a first protocol CAN-based message as configured in accordance with various embodiments of the invention.

More specifically, FIG. 5 shows an example CAN bit with a Propagation Segment 205 of eight time quanta and two phase segments 203 and 204 of one time quantum each. The bit starts with the Sync_Seg 202 where any voltage shift 201 is done during this time. The voltage level over the bit time is depicted by the bold line 206. The modules supporting the second protocol would use the Prop_Seg for an embedded high speed bit stream by sampling the voltage value of each time quantum and decode the value according to the CAN rules, where a sensed voltage is decoded as zero and no voltage as one. Modules supporting only the original CAN protocol would decode the falling edge 201 as a synchronization or resynchronization edge and ignore the following voltage shifts. The voltage level at the sample point 207 is dominant and the CAN module will decode the bit correctly to a zero. Modules supporting the second protocol would decode the sample points 210 to 217 as follows: 210=0; 211=1; 212=1; 213=1; 214=0; 215=0; 216=1; 217=0. Here, the processing device for the module is configured to use same voltage levels for signal designations for both the first protocol and the second protocol, although this is not necessary. Indeed, the processing device may instead be configured to implement the second protocol by adding bits inside of individual bit quanta of the first protocol not measured to be a particular level according to the first protocol FIG. 6 illustrates an example of embedding a second protocol message through a whole first protocol CAN based message. The dashed line 300 shows the voltage level on a bus as interpreted by CAN starting with an idle bus. The solid line 320 shows the voltage levels of the second protocol embedded into the standard CAN message as described above. The falling edge 301 is indicating a Start Of Frame (SOF) bit 303. The falling edge is detected in the Sync_Seg 304, and the value of the bit is verified at the sample point 305 by a module supporting the original CAN protocol. It disregards any additional falling edges such as the edge 322 after the initial edge 302. A module supporting the second protocol would read 0 1 1 1 0 0 1 0 in the bit sequence 321 embedded in the CAN bit. The two first CAN bits 306 and 307 after SOF have the value 1 1. The edge 308 at the beginning of bit 306 is a rising one, thus not affecting the CAN resynchronization. The embedded second protocol transmits 1 0 0 0 1 1 0 1 in this CAN bit 306, including generating a falling edge 323. The CAN module will disregard this edge as well as the following edge 324 because it is not looking for edges at these points and will not resynchronize because it sampled a dominant level at the Sampling Point 305. The CAN module will correctly sample a recessive level at point 309, assume the next bit 307 to start at point 310, and calculate the position of the sample point 311.

In this example, however, the second protocol will generate a falling edge 326 two bit quanta from the assumed start 310 of bit 307, which will cause the CAN module to then resynchronize and move the sampling point one bit quantum to 312 (as the Phase_Seg for this example is only one bit quantum long). The CAN module will still correctly sample the bit value as 1 but at a false position in the CAN message used by the transmitting module supporting the second protocol. The next falling edge 327 in the following CAN bit 313 would move the CAN sampling point another time quantum and into the wrong bit. Then it could wrongly sample a dominant level generated by the second protocol as indicated by 314.

To avoid this error, the processing device for the module operating under the second protocol is configured to set a Sync_Seg bit quantum as dominant. The drawback of this rule is that it will introduce more falling edges in CAN messages compared with the original CAN protocol, but any high speed protocol would similarly create additional falling edges.

Figure 7:
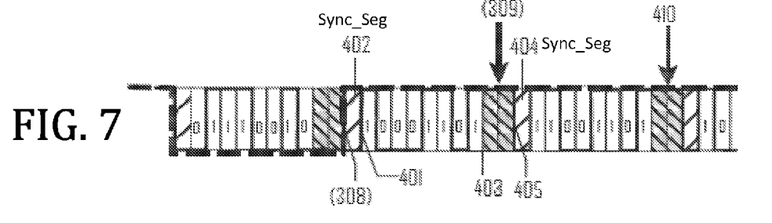
FIG. 7 comprises a schematic of an example of embedding a second protocol message in a portion of a first protocol CAN-based message with a Sync_Seg portion set as dominant as configured in accordance with various embodiments of the invention.

FIG. 7 shows the same message as FIG. 6 but with the new rule of the second protocol applied. The anticipated rising edge 308 is now replaced by the rising edge 401 of the second protocol as the Sync_Seg 402 is dominant. The second protocol could have moved the rising edge all the way to Phase_Seg1 at 403 and the CAN module would still have sampled correctly at 309. The Sync_Seg 404 will generate a falling edge 405 that will resynchronize the CAN modules and they will correctly sample a 1 at the sample point 410. Using such an approach illustrates one way the processing device for a module operating the second protocol can be configured to effect synchronization with the second communication device over the control network for both the first protocol and the second protocol based on a same portion of the message packet including one sent according to a CAN protocol.

Referring back to FIG. 2, shows that the part 108 from the Arbitration field 107 to the Acknowledgment bit 115 contains 86 CAN bits where a second protocol can be embedded. With an embedded protocol implemented according to the example above, an additional 86 bytes could be added to an 8 byte CAN message. In one approach, the embedded protocol can include a cyclic redundancy code (CRC) sum of some 24 bits. Also, the last of these bits have to be reserved for transmission of an error frame in case of a faulty CRC sum. If a 24 bit CRC sum is regarded sufficient for 89 byte data from an embedded protocol, then an eight byte CAN message could transfer 97 bytes of data, increasing the bandwidth of a CAN communication 12 times.

In the example, the amount of eleven bit quanta was chosen to constitute a CAN bit. Eighteen bit quanta could have been chosen to embed two bytes in each CAN bit. The bandwidth could then be increased 24 times. The CAN specification states that a bit should be programmable to at least 25 bit quanta, so the bandwidth could be increased even more, such as by using 35 or 67 bit quanta for a bit. The limit is set only by the quality of the clocks, transceivers, and cabling of the system in use. So configured, one advantage is that protocols like CAN can be gradually enhanced as new module designs can take advantage of more modern and sophisticated components and still be fully backwards compatible in systems with legacy modules.

Starting from the above framework, many modified approaches can be used to fit various control network design needs.

In one example, U.S. Pat. No. 7,711,880 titled "Schematizing of messages in distributed control and supervision system" and incorporated herein by reference describes several ways to design CAN systems in a way that collisions are avoided such as by combining scheduling of messages and the CAN collision resolution mechanism. The CanKingdom protocol describes how to build up a protocol from protocol primitives. Any CAN system has a limited number of messages. Assuming that the number of such messages is in the range between 128 and 256, the arbitration field could be limited to one byte. The RTR bit CAN protocol primitive is optional and may not be used in this example. Moreover, the two reserved bits in the Control field do not contribute where a system specific protocol is created and legacy CAN modules do not participate. The DLC field can be modified and then allow for defining 16 different lengths of the data field according to a given need.

If such approaches are employed in a given control network, then the Arbitration field 107 for CAN messages on that network can be used by the embedded protocol. In this approach, the processing device for a module operating the second protocol is configured to use complete or partial collision avoidance for the CAN-based first protocol and to embed at least a portion of the second message in an arbitration portion of the message packet. This would add another 12 or 32 embedded bytes to a CAN message as implemented in the example above, such that 109 or 129 data bytes can be included in one CAN transmission.

In another example, the maximum bit rate of a CAN communication is limited by the bus length. U.S. Pat. No. 5,696,911 titled "Arrangement for eliminating malfunction and/or permitting high-speed transmission in a serial bus connection, and transmitter and receiver units linked to the latter" and incorporated herein by reference describes how a higher bit rate can be used when some modules can be turned into a silent mode, and thus not fully participating in the CAN error protection procedure. By applying an embedded protocol as described above into such a system, the bandwidth of the communication could be increased another order of magnitude.

Moreover, the second protocol can be implemented in any of a variety of ways. In the example above, the embedded protocol has a NRZ bit coding but it could have been coded in another way, such as manchester or miller coded. In a case where the processing device is configured to implement the second protocol by using an encoding method based on CAN, additional advantages can be realized, especially where the first protocol is CAN based. In such a situation, systems could be gradually upgraded. Some CAN higher layer protocols use only a few CAN identifiers and extend the identification into one or two of the data bytes. CanKingdom is an example on such a protocol. It uses the CAN_Std. ID 0 for setup messages and each node has one CAN ID for response messages. In such an approach, the setup time for a control network could be significantly shortened for the modules supporting the embedded protocol because all setup instructions to the module could be carried in one message with all responses to the instructions sent by the module in another message. More specifically, the processing device for the module is configured to receive a setup message and derive from the setup message information sufficient to configure the first protocol for communication over the bus and information sufficient to configure the second protocol for communication over the bus. That same setup message is configured to allow a device configured to operate only under the first protocol to configure itself in response to receiving the setup message. In one approach, the processing device for the module operating the second protocol can be configured to use a same software module to configure itself at set up time for both the first protocol and the second protocol. Virtually no changes have to be done in the software, and mixing new modules with legacy modules would not create any problem. Legacy modules would receive one instruction in each message (as today) but new ones would get everything in one message. As the contents are defined by the CAN id 0 and the first two bytes, the decoding would be the same in both instances.

Additional efficiencies can be realized in this manner where the processing device is configured to implement the second protocol by sharing at least one of the group consisting of: an error state message portion, an initialization message portion, an acknowledgment message portion, a sampling portion, and any combinations thereof with the message packet sent according to the first protocol. Where both the first protocol and second protocol utilize CAN based approaches, the processing device implementing the second module can be configured to implement the second protocol by sharing at least one of the group consisting of: a start of frame bit, an arbitration field, an error state bit, an acknowledgment bit, an end of frame bit, and any combinations thereof with the message packet sent according to the CAN protocol. Although the acknowledge bit is transmitted by all modules, the second protocol may or may not use this message to configure a module for further communication with an acknowledging module.

Additional modifications to the bit coding of an embedded protocol can be employed where the bit stuffing arrangement of the CAN protocol is omitted. Bit stuffing is not needed for the second protocol described above because the longest time between resynchronization edges is five consecutive dominant CAN bits. A CRC sum is calculated after each CAN byte and placed in the next two CAN bits. If a CRC mismatch is detected a CAN error frame is transmitted.

These teachings are scalable where one module can be configured to communicate over the control network using a third protocol by communicating, during transmission of a message packet over the control network according to the first protocol, a third message embedded within the message packet using a third protocol. In another approach, different modules can embed different protocols. These embedded protocols do not have to follow any design rules of CAN. The voltage level in the example above is the same as for CAN, but it could have been different. Thus, a multitude of protocols, optimized for different purposes, can be embedded. Different groups of nodes in a CAN network may use different embedded protocols. For instance, the processing device for a module can be configured to change an encoding method for the second protocol in response to a change in operation mode for the communication device apparatus with such modes including, for example, a maintenance mode, a re-flashing mode, a run mode, a sleep mode, and the like. The bit rate for the second protocol could be modified as well.

Moreover, the processing device can configured to apply the second protocol to fewer than every first protocol message sent from the communication device apparatus. For example, in many systems, the CAN bandwidth is quite sufficient for the most part of time during runtime conditions. In such applications, the embedded protocol will be used only for some specific messages that may require multiple transmissions over the first protocol, one example being GPS coordinates. The embedded protocol may also be used for diagnostics. Now On Board Diagnostics (OBD) is a legislated part of CAN communication in vehicles, requiring some message exchange during runtime conditions. This creates a bandwidth and as well a timing problem as OBD messages only appears when diagnostic checks are performed. Where a communication module is configured to operate in a vehicle bus, its the processing device can thus be configured to effect transmission of vehicle on board diagnostics information using the second protocol during runtime sending of messages using the first protocol. Such application of an embedded protocol as described herein would eliminate the problem as OBD information could be carried by the embedded protocol and would neither affect timing nor bandwidth during runtime conditions. Another example is where a vehicle system is re-flashed. In this example, the processing device of the module is configured to control participation in a flashing operation of devices on the bus using the second protocol to reduce system delays during the flashing operation.

Still another benefit to the describe approach is using the second protocol to help identify network problems. For instance, disturbances on the bus comprise a common CAN problem that can often be hard to find and cure. Such disturbances include wave reflections due to impedance shifts along the bus, clock frequency changes due to temperature variations across different nodes, and temporary distortions due external sources. Often, the disturbance at only one node in a system can alone destroy a CAN message. The margin to failure is typically not known.

As said above, the embedded high speed protocol is typically only occasionally needed. When not used to communicate using the embedded protocol, the equipment can be used for an almost continuous quality check of the physical layer. In this approach, the processing device for a module is configured to use the second protocol to test signal quality for the control network. By one approach, the processing device is configured to control the second protocol to use a bit rate higher than the first protocol's bit rate and to determine whether second protocol bits embedded in a received first protocol message vary from an expected signal level as compared to a signal level expected for a corresponding portion of the received first protocol message when the received first protocol message does not have a message embedded using the second protocol. In other words, each module is set to listen to the bus, and during an idle bus, no zeroes should be detected. When a CAN message is transmitted, all bits in the bytes in the embedded protocol should have the same value as the CAN bit.

Figure 8:
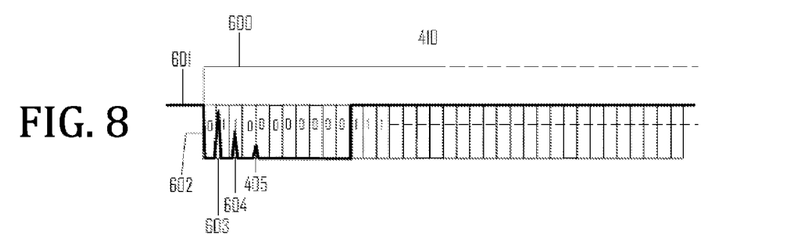
FIG. 8 comprises a schematic of an example of how a module operating using a second protocol message within a portion of a first protocol CAN-based message as configured in accordance with various embodiments of the invention may interpret a received message with a signal distortion.
Figure 9:
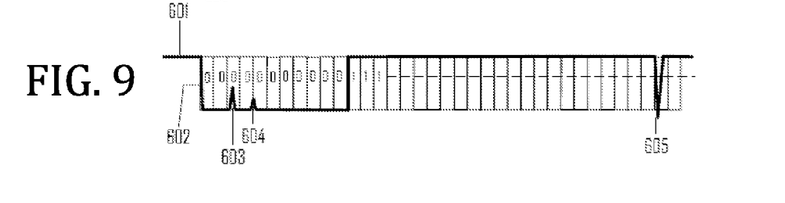
FIG. 9 comprises an example of how a second module operating using a second protocol message within a portion of a first protocol CAN-based message as configured in accordance with various embodiments of the invention may interpret the received message of FIG. 8 with a different signal distortion.
Figure 10:
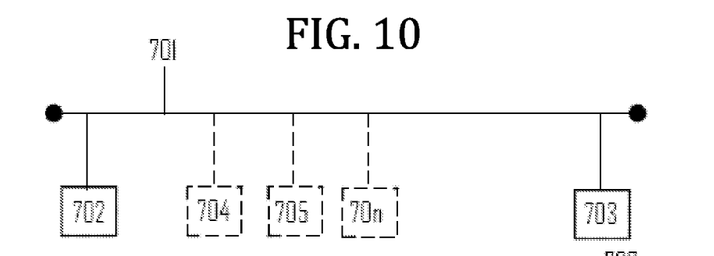
FIG. 10 comprises a block diagram of an example control network as configured in accordance with various embodiments of the invention.

To illustrate this point, FIG. 8 shows the beginning of a received CAN message 600 sent from another module starting at recessive level 601 and a falling edge 602, indicating SOF. The falling edge is followed by three reflections 603, 604, 605. The two first ones are decoded as 11 indicating that the two first time quanta after a falling edge is not safe for the embedded protocol. FIG. 9 shows the same message at another module further from the reflection spot. Here the reflections are damped to a safe level for the embedded protocol. Another disturbance 605 is detected that easily could be seen as a false resynchronization edge or, if appearing at a sampling point, cause a bit error. Modules supporting, but not using, the embedded protocol could detect and log such disturbances that could make CAN modules resynchronize on false edges and/or sample wrong bit values. The disturbances would be very accurately be time tagged according to the local clock at the respective module. Then, the processing device can effect sending information regarding determining whether the second protocol bits embedded in the received first protocol message varied from the expected signal level to a comparator device that is configured to compare the information to corresponding information from other devices on the control network to locate a source of control network error. This can be implemented by using the time recorded according the respective local clock as transposed to a common time, examples of which are described in U.S. Pat. No. 8,065,052, the contents of which are incorporated by reference herein. Disturbances caused by an impedance change on the bus can be distinguished from other types of disturbances and, as the wave propagation speed in the bus is known, it is also possible to determine the position of the impedance disorder in the bus by correlating the time stamps of the disturbance at the respective node and the bus length between respective node.

If it is determined that for a given control network that disturbances occur primarily in particular portions of a first protocol message, such as close to edges in the example above, the embedded protocol can be modified to refraining from using particular portions of the first protocol for embedding. In the above example, the second protocol could be configured to avoid using one or more of the first time quanta in the Prop_Seg for embedding data. The higher layer protocol CanKingdom demonstrates how the CAN bit timing can be optimized by using Kings Page 8, which same method could be used to specify the time quanta that should be used by the embedded protocol. In another such approach, the whole embedded protocol could be set up in a system specific way by applying the CanKingdom method, still using general modules.

In a further quality check, the clock for counting on the second protocol could be used to detect differences between a local clock and that of another device on the control network. In such an approach, the module typically uses separate counters for decoding the first protocol, such as a CAN protocol, and the embedded second control. Here, the processing device is configured to operate in a mode where no embedded second message is expected and when operating in the mode, to not resynchronize a counter for the second protocol in response to receiving a synchronizing portion of a received first protocol message. Then the processing device counts clock ticks of the counter for the second protocol over a portion of the received first protocol message to determine a clock rate for a module that transmitted the received first protocol message. Thus, in parallel to participating in the CAN communication, a node could easily determine the difference between the local clock frequency and the clock frequency of the respective transmitter by refraining to resynchronize the clock of the embedded protocol by comparing the time from the end of the arbitration field until the falling edge of the ACK bit as registered by the resynchronized CAN clock and the un-resynchronized clock of the embedded protocol. Additional advantages can be achieved by combining the current teachings with techniques described according to the U.S. Pat. No. 7,934,039 and U.S. Pat. No. 7,478,234, each of which are incorporated by reference herein in their entireties.

Figure 11:
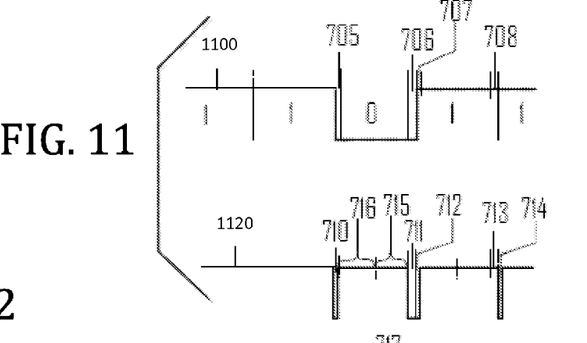
FIG. 11 comprises a comparison of schematics of an example message sent from one module and how that message is perceived by a second module as configured in accordance with various embodiments of the invention.

A further example implementation of a second protocol inside a first protocol will be described with reference to FIGS. 10-13. In this example, a CAN bus 701 has an electronic control unit (ECU) 702 connected at the bus's 701 far left end and a second ECU 703 connected at the bus's 701 far right end. In between these ECUs 702 and 703 more ECUs 704, 705, 70n are connected to the bus 701. The second ECU 703 transmits a message 1100 according to the CAN protocol, a part of which is illustrated in FIG. 11. A bit sequence 1 1 0 1 1 for the message 1100 according to the CAN specification is illustrated. More specifically, the Sync_Seg 705 and the Phase_Seg 1 and 2 706 of the 0 bit of the CAN message 1100 are illustrated. Next, the Sync_Seg 707 and the Phase_Seg 1 and 2 708 of the second 1 bit of the CAN message 1100 are illustrated.

Where the second ECU 703 is configured to operate according the second protocol as described herein, the ECU 703 will signalize the same bit sequence as illustrated in the message 1120. Here, the Sync_Seg 710 is understood as a one dominant bit quantum. The next part is recessive until the dominant Pase_Seg 1 and 2 711 followed by the dominant Sync_Seg 712 and the recessive Phase_Seg 1 and 2 713 of the first 1 bit following the zero bit in the original CAN message 1100. The second 1 bit after the zero bit is initiated by the dominant Sync_Seg 714. Under the original CAN protocol, a Prop_Seg is calculated to determine the signal delay between the ECUs 702 and 703, which is specified to be eight bit quanta, shown as 715. An additional nine bit quanta 716 are added to the left of the bit. The second protocol in this example is defined as one byte represented as one Start of Byte bit quantum followed by eight bit quanta.

Figure 12:
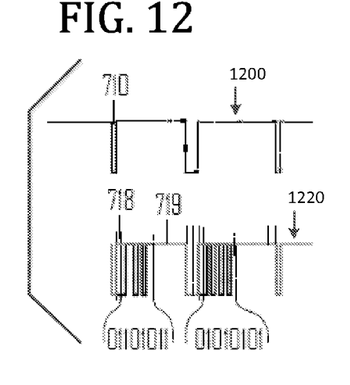
FIG. 12 comprises a comparison of schematics of an example message sent from one module and how a second module transmits a message in a second protocol in response to receipt of the example message as configured in accordance with various embodiments of the invention.
Figure 13:
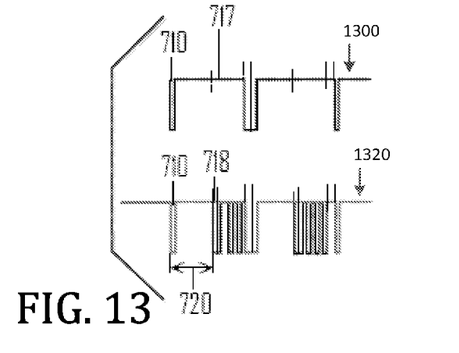
FIG. 13 comprises a comparison of schematics of an example message sent from one module and how a second module transmits a message in a second protocol in response to receipt of the example message as configured in accordance with various embodiments of the invention.

The ECU 702 is instructed to use specific bits in a specific CAN message for transmitting bytes according to the second protocol. In this example, the segment 716 shows where in the original CAN protocol message 110 these bits are transmitted from the ECU 703. To illustrate the time delay on the bus and how the modules send information despite the time delay, FIGS. 12 and 13 illustrate what is sent 1200, 1300 by the first ECU 702 and what is received and transmitted 1220, 1320 by the second ECU 703. FIG. 12 is arranged according time perceived by the second ECU 703 whereas FIG. 13 is arranged according to time perceived by the first ECU 702. The transmission 717 from the first ECU 702 starts with the Sync_Seg 710. It propagates along the CAN bus 701 and reaches the second ECU 703. When it is detected by the ECU 702, the ECU 702 transmits the Start of Byte 718 followed by the bits 01101011 according to the second protocol. This is illustrated in FIG. 12 where the bits 01101011 are transmitted immediately in response to receiving the Sync_Seg 710 from the first ECU 702. The second ECU 703 then transmits a second byte 01010101 according to the second protocol in response to receiving the Sync_Seg 712 from the first ECU 702. This second protocol signal from the second ECU 703 propagates back to the first ECU 702, but due to the propagation delay, it is now positioned in the second part 715 of the original CAN signal being transmitted by the first ECU 702. The time difference 720 between 710 and 718, i.e., the propagation delay between the ECUs 702 and 703, is then readily measured by the first ECU 702.

So configured, not only can signals according to a second protocol from different ECUs be embedded in one and the same message according to a first protocol, but also the propagation delay between ECUs can easily be measured. A great variety of protocols with different qualities can be created by combining these teachings with those of certain prior teachings such as those described by U.S. Pat. No. 7,711,880 titled Schematizing Of Messages In Distributed Control And Supervision, U.S. Pat. No. 7,472,216 titled Variable Oscillator For Generating Different Frequencies In A Controller Area Network (CAN), U.S. Pat. No. 7,899,936 titled Device In A Modularized System For Effecting Time-Stamping Of Events/Reference Events, and U.S. Pat. No. 7,478,234 titled Distributed Control And Monitoring System, to name but a few, each of which is incorporated by reference herein in their entireties.

The various protocols described herein may also be applied in different control network topologies. In one example illustrated in FIG. 14, a CAN-based control network 1400 has a star topology with an active hub device 1410 in the center. The active hub device 1410 is configured to connect to a plurality of CAN channels 1422, 1424, and 1426 of the control network 1400 and act as a gateway among two or more of the plurality of CAN channels 1422, 1424, and 1426. For example, the active hub device 1410 can be an ECU connected to communicate on each of the multiple CAN channels 1422, 1424, and 1426.

Figure 14:
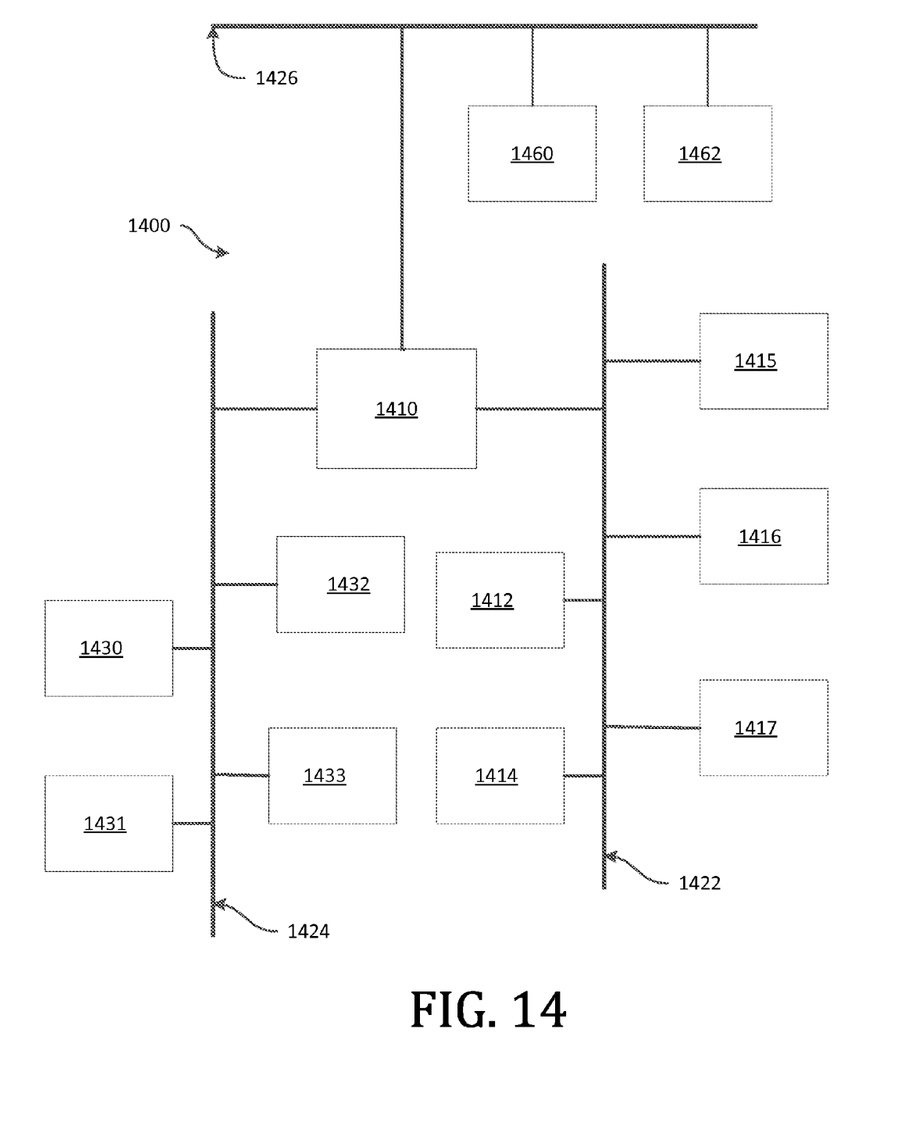
FIG. 14 comprises a block diagram of an example control network having a star topology as configured in accordance with various embodiments of the invention.

In an example implementation of such a star topology network having a plurality of modules, a first set of the plurality of modules 1412, 1414, 1415, 1416, 1417 is configured to communicate using both a first and second protocol as described herein and is connected to communicate on a first CAN channel 1422 of the plurality of CAN channels. A second set of the plurality of modules 1430, 1431, 1432, 1433 are connected to communicate over the control network 1400 using the first protocol and not the second protocol over a second CAN channel 1424. A third set of the plurality of modules 1460, 1462 are connected to communicate over a third CAN channel 1426 of the plurality of CAN channels using both the first protocol and a third protocol by sending a message packet using the first protocol with a third protocol based message embedded within the message packet using the third protocol. The third protocol may or may not be compatible with the second protocol. Here, the active hub device 1410 is configured to receive messages using the second protocol via the first CAN channel 1422 and to send the messages using the third protocol via the third CAN channel 1426.

In another example of having multiple modules communicating in a given context, multiple modules configured to use an embedded protocol can be configured to receive a signal that a forthcoming first protocol message will be sent and configured to allow multiple second protocol messages to be embedded during the time of transmission of the forthcoming message. In response, the multiple modules can configure themselves such that individual ones of the modules send second protocol messages during certain portions of the forthcoming first protocol message. From a single module's point of view, the first module is configured to receive a signal that a forthcoming first protocol message will be sent and to configure itself to send a message based on the second protocol during a first defined portion of the forthcoming first protocol message less than a whole of the forthcoming first protocol message and to receive a second protocol message from another module during a second defined portion of the forthcoming first protocol message different from the first defined portion. Accordingly, multiple second protocol based modules can send information during the course of a single first protocol message, which can greatly reduce communication latency when multiple modules need to exchange information.

In one specific example of such an approach, one "master node" transmits a CAN based message with a given CAN ID and DLC, such as, for example, 1000 bits. The data field is then patterned with 1's. On the bus there will then be a pattern of ten blocks containing five recessive bits and one dominant bit. Each of the ten recessive bits can be used for the embedded protocol in different ways. One example could be to have an embedded protocol as suggested above, where each CAN bit can carry a byte according to the embedded protocol. The decoding rules for the information in the embedded protocol is given by the CAN ID in principally the same way as CAN higher layer protocols. The data bits are then scheduled, such that the first two five-bit sequences are reserved for a second protocol transmission from a first node, the second two five-bit sequences are reserved for a second protocol transmission from a second node, the third two five-bit sequences are reserved for a second protocol transmission from a third node, and so forth. Each module can then send eight bytes of data and a 15 bit CRC sum as in an ordinary CAN message. In this way, the latencies of transmissions from these second protocol nodes can be considerably reduced. For instance, transmissions from five nodes can be reduced five times, and the latencies between the data packages among these five nodes are known a priori to a high accuracy in this example. Different schemes can be applied according to different needs. Not only the data field can be used but also recessive bits in the CRC field, the CRC delimiter and the recessive bits after the ACK bit.

In an additional alternative embodiment, the functionality or logic described in above may be embodied in the form of code that may be executed in a separate processor circuit. If embodied in software, each block of functionality or logic may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s). Accordingly, a computer readable medium (being non-transitory or tangible) may store such instructions that are configured to cause a processing device to perform operations as described herein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of communication among two or more modules over a common control network, the method comprising:
   during transmission of a message packet over a control network according to a first protocol comprising CAN protocol, sending from a first module over the control network a second message embedded within the message packet using a second protocol;
   synchronizing the first protocol and the second protocol of the first module with the first protocol and the second protocol of a second module on the control network based on at least a portion of the message packet by setting a bit quantum in a synchronization portion of a bit following a recessive first protocol bit as dominant.

2. The method of claim 1 further comprising controlling participation in a flashing operation of modules on the bus using the second protocol.

3. The method of claim 1 further comprising applying the second protocol to fewer than every first protocol message sent from the first module.

4. The method of claim 1 wherein the control network comprises a vehicle bus; wherein method further comprises transmitting vehicle on board diagnostics information using the second protocol during runtime sending of messages using the first protocol.

5. The method of claim 1 further comprising using the second protocol to test signal quality for the control network.

6. The method of claim 5 further comprising:
controlling the second protocol to use a bit rate higher than the first protocol's bit rate;
determining whether second protocol bits embedded in a received first protocol message vary from an expected signal level as compared to a signal level expected for a corresponding portion of the received first protocol message when the received first protocol message does not have a message embedded using the second protocol.

7. The method of claim 1 further comprising sending information regarding determining whether the second protocol bits embedded in the received first protocol message varied from the expected signal level to a comparator device that is configured to compare the information to corresponding information from other devices on the control network to locate a source of control network error.

8. The method of claim 1 further comprising synchronizing both the first protocol and the second protocol with the second communication device over the bus based on a same portion of the message packet.

9. The method of claim 1 further comprising:
operating in a mode where no embedded second message is expected;
when operating in the mode:
not resynchronizing a counter for the second protocol in response to receiving a synchronizing portion of a received first protocol message and
counting clock ticks of the counter for the second protocol over a portion of the received first protocol message to determine a clock rate for a module that transmitted the received first protocol message.

10. The method of claim 1 further comprising the first module's using a same software module to configure itself at set up time for both the first protocol and the second protocol.

11. The method of claim 10 further comprising receiving a setup message and deriving from the setup message information sufficient to configure the first protocol for communication over the bus and information sufficient to configure the second protocol for communication over the bus, wherein the setup message is configured to allow a device configured to operate only under the first protocol to configure itself in response to receiving the setup message.

12. The method of claim 1 further comprising using complete or partial collision avoidance for the CAN protocol and embedding at least a portion of the second message in an arbitration portion of the message packet.

13. The method of claim 1 wherein the setting the bit quantum as dominant comprises setting a Sync_Seg bit quantum as dominant.

14. The method of claim 1 further comprising embedding the second message in a Prop_Seg portion of CAN bits of the first message.

15. The method of claim 1 further comprising the first module receiving a signal that a forthcoming first protocol message will be sent and to configuring itself to send a message based on the second protocol during a first defined portion of the forthcoming first protocol message less than a whole of the forthcoming first protocol message and to receive a second protocol message from another module during a second defined portion of the forthcoming first protocol message different from the first defined portion.

16. A communication device apparatus for communicating with other devices over a control network, the communication device apparatus comprising:
a communication port configured to connect to a control network;
a processing device operatively connected to the control network to control receiving and sending communications over the control network, the processing device configured to communicate, during transmission of a message packet over the control network according to a first protocol comprising CAN protocol, a second message embedded within the message packet using a second protocol;
wherein the processing device is further configured to effect synchronization with a second communication device over the control network for the first protocol and the second protocol based on at least a portion of the message packet by setting a bit quantum in a synchronization portion of a bit following a recessive first protocol bit as dominant.

17. The communication device apparatus of claim 16 wherein the processing device is configured to control participation in a flashing operation of devices on the bus using the second protocol.

18. The communication device apparatus of claim 16 configured to operate in a vehicle bus; wherein the processing device is configured to effect transmission of vehicle on board diagnostics information using the second protocol during runtime sending of messages using the first protocol.

19. The communication device apparatus of claim 16 wherein the processing device is configured to apply the second protocol to fewer than every first protocol message sent from the communication device apparatus.

20. The communication device apparatus of claim 16 wherein the processing device is configured to use the second protocol to test signal quality for the control network.

21. The communication device apparatus of claim 19 wherein the processing device is configured to control the second protocol to use a bit rate higher than the first protocol's bit rate and to determine whether second protocol bits embedded in a received first protocol message vary from an expected signal level as compared to a signal level expected for a corresponding portion of the received first protocol message when the received first protocol message does not have a message embedded using the second protocol.

22. The communication device apparatus of claim 20 wherein the processing device is configured to effect sending information regarding determining whether the second protocol bits embedded in the received first protocol message varied from the expected signal level to a comparator device that is configured to compare the information to corresponding information from other devices on the control network to locate a source of control network error.

23. The communication device apparatus of claim 16 wherein the processing device is configured to effect synchronization with the second communication device over the control network for both the first protocol and the second protocol based on a same portion of the message packet.

24. The communication device apparatus of claim 16 wherein the processing device is configured to operate in a mode where no embedded second message is expected and when operating in the mode, to not resynchronize a counter for the second protocol in response to receiving a synchronizing portion of a received first protocol message and to count clock ticks of the counter for the second protocol over a portion of the received first protocol message to determine a clock rate for a module that transmitted the received first protocol message.

25. The communication device apparatus of claim 16 wherein the processing device is configured to use a same software module to configure itself at set up time for both the first protocol and the second protocol.

26. The communication device apparatus of claim 25 wherein the processing device is configured to receive a setup message and derive from the setup message information sufficient to configure the first protocol for communication over the bus and information sufficient to configure the second protocol for communication over the bus, wherein the setup message is configured to allow a device configured to operate only under the first protocol to configure itself in response to receiving the setup message.

27. The communication device apparatus of claim 16 wherein the processing device is configured to use complete or partial collision avoidance for the CAN protocol and to embed at least a portion of the second message in an arbitration portion of the message packet.

28. The communication device apparatus of claim 16 wherein the processing device is configured to set the bit quantum in the synchronization portion of the bit following the recessive first protocol bit as dominant by setting a Sync_Seg bit quantum as dominant.

29. The communication device apparatus of claim 16 wherein the first module is configured to receive a signal that a forthcoming first protocol message will be sent and to configure itself to send a message based on the second protocol during a first defined portion of the forthcoming first protocol message less than a whole of the forthcoming first protocol message and to receive a second protocol message from another module during a second defined portion of the forthcoming first protocol message different from the first defined portion.

* * * * *